US012411010B2

(12) United States Patent
Tritschler et al.

(10) Patent No.: US 12,411,010 B2
(45) Date of Patent: Sep. 9, 2025

(54) GYROSCOPE ASSEMBLY WITH RING RESONATOR AND INTERFERENCE PATH

(71) Applicant: Robert Bosch GmbH, Stuttgart (DE)

(72) Inventors: Patrick Tritschler, Engen (DE); Torsten Ohms, Vaihingen/Enz-Aurich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 263 days.

(21) Appl. No.: 18/348,771

(22) Filed: Jul. 7, 2023

(65) Prior Publication Data

US 2024/0011774 A1    Jan. 11, 2024

(30) Foreign Application Priority Data

Jul. 11, 2022  (DE) .................. 10 2022 207 074.7

(51) Int. Cl.
    *G01C 19/72* (2006.01)
(52) U.S. Cl.
    CPC ......... *G01C 19/726* (2013.01); *G01C 19/725* (2013.01); *G01C 19/727* (2013.01)
(58) Field of Classification Search
    CPC .. G01C 19/726; G01C 19/725; G01C 19/727; G01C 19/721
    See application file for complete search history.

(56) References Cited

U.S. PATENT DOCUMENTS

| 5,398,111 A * | 3/1995 | Cardarelli | G01C 19/727 |
| | | | 372/6 |
| 8,031,343 B2 * | 10/2011 | Carothers | G01C 19/72 |
| | | | 356/461 |
| 2004/0061863 A1 * | 4/2004 | Digonnet | G01D 5/3538 |
| | | | 356/483 |
| 2010/0328673 A1 * | 12/2010 | Carothers | G01C 19/72 |
| | | | 356/460 |
| 2020/0372334 A1 | 11/2020 | Carolan et al. | |
| 2022/0187074 A1 | 6/2022 | Lam et al. | |
| 2022/0365400 A1 * | 11/2022 | Zeiler | G02F 1/212 |
| 2023/0417551 A1 * | 12/2023 | Tritschler | G01C 19/661 |

(Continued)

OTHER PUBLICATIONS

Ciminelli et al., "Photonic Technologies for Angular Velocity Sensing," Advances in Optics and Photonics, vol. 2, No. 3, 2010, pp. 370-404. <https://www.researchgate.net/publication/238523329_Photonic_technologies_for_angular_velocity_sensing/link/58016b5208ae1c5148c9fe72/download> Downloaded Jul. 7, 2023.

(Continued)

*Primary Examiner* — Jonathan M Hansen
(74) *Attorney, Agent, or Firm* — NORTON ROSE FULBRIGHT US LLP

(57) ABSTRACT

An optical gyroscope assembly for measuring a rotation rate. The optical gyroscope assembly includes a first multimode interferometer with an input for receiving light and two outputs, each connected to a second light guide; a ring resonator on each of the second light guides; a second multimode interferometer with two inputs, each connected to one of the second light guides, and two outputs, each connected to a third light guide; and a third multimode interferometer with two inputs, each connected to one of the third light guides, and two outputs, each connected to a fourth light guide.

15 Claims, 3 Drawing Sheets

(56) References Cited

U.S. PATENT DOCUMENTS

2024/0133672 A1* 4/2024 Parker .................. G01P 3/36

OTHER PUBLICATIONS

Faucheux et al., "The Ring Laser Gyro," Journal of Optics, IOP Publishing, vol. 19, No. 3, 1988, pp. 101-115. <https://www.researchgate.net/publication/230932172_Ring_Laser_Gyro/link/551aa1990cf244e9a458a90f/download> Downloaded Jul. 7, 2023.

Kolkiran et al., "Heisenberg Limited Sagnac Interferometry," Optics Express, vol. 15, No. 11, 2007, pp. 6798-6808. <https://opg.optica.org/directpdfaccess/d38a9b13-f0b8-4a01-b26e3195879f9adb_134973/oe-15-11-6798.pdf?da=1&id=134973&seq=0&mobile=no> Downloaded Jul. 7, 2023.

Fink et al., "Entanglement-Enhanced Optical Gyroscope," New Journal of Physics, IOP Publishing, vol. 21, No. 5, 2019, pp. 1-7. <https://iopscience.iop.org/article/10.1088/1367-2630/ab1bb2/pdf> Downloaded Jul. 7, 2023.

De Leonardis et al., "On-Chip Group-IV Heisenberg-Limited Sagnac Interferometric Gyroscope at Room Temperature," Sensors, vol. 20, No. 12, 2020, pp. 1-15. <https://www.mdpi.com/1424-8220/20/12/3476> Downloaded Jul. 7, 2023.

Lu et al., "Chip-Integrated Visible-Telecom Entangled Photon Pair Source for Quantum Communication," Nature Physics, vol. 15, 2019, pp. 1-17. <https://www.ncbi.nlm.nih.gov/pmc/articles/PMC6605094/pdf/nihms-1526062.pdf> Downloaded Jul. 7, 2023.

* cited by examiner

GYROSCOPE ASSEMBLY WITH RING RESONATOR AND INTERFERENCE PATH

CROSS REFERENCE

The present application claims the benefit under 35 U.S.C. § 119 of German Patent Application No. DE 10 2022 207 074.7 filed on Jul. 11, 2022, which is expressly incorporated herein by reference in its entirety.

FIELD

The present invention relates to an optical gyroscope assembly for measuring a rotation rate.

BACKGROUND INFORMATION

There are optical gyroscopes based on the Sagnac effect. In this respect, there are fiber-based and ring-laser-based, commercially available solutions. Fiber-based gyroscopes are based on light being continuously transmitted into a glass fiber in two opposite directions. Due to the Sagnac effect, the effectively traveled length of the two light paths varies during a rotation of the system. This shifts the phase of the light. After passing through the glass fiber, the two light paths meet again and the light waves are superposed. Constructive and destructive interference occurs and a light wave results, the intensity of which varies proportionally to the rotation rate and which is measured, cf. Caterina Ciminelli, Francesco Dell'Olio, Carlo E. Campanella, and Mario N. Armenise, "Photonic technologies for angular velocity sensing," Adv. Opt. Photon. 2, 370-404 (2010).

In ring laser gyroscopes, light is transmitted in two opposite directions into a ring resonator. Ring resonators are closed, circular structures in which light can circulate. Here too, during the rotation of the system, the effective path length varies due to the Sagnac effect, and the frequency of the light thus changes. Since particular frequencies are amplified and others are attenuated in a ring resonator, the intensity varies during a rotation. The latter can be measured and is proportional to the rotation rate, cf. Ciminelli et al, ibid.; M. Faucheux, D. Fayoux and J. J. Roland, "The ring laser gyro," IOP Publishing, Vol. 19 No. 3 (1988).

For these fiber-based and ring-laser-based gyroscopes, there are only large, bulky solutions commercially. Chip-integrated solutions require very high-quality manufacturing in order to achieve high sensitivity like the large solutions. In order to achieve a higher sensitivity, there is the possibility of using entangled photons, cf. Aziz Kolkiran and G. S. Agarwal, "Heisenberg limited Sagnac interferometry," Opt. Express 15, 6798-6808 (2007).

For the fiber-based gyroscopes, there are first attempts at exploiting this quantum enhancement, cf. Matthias Fink, Fabian Steinlechner, Johannes Handsteiner, Jonathan P. Dowling, Thomas Scheidl, Rupert Ursin, "Entanglement-enhanced optical Gyroscope," IOP Publishing, Vol 21 No. 5 (2019). In this case, two photons entangled with one another are transmitted in opposite directions into a glass fiber. These photons are produced either by means of crystals, such as PPKTP crystals, or in long waveguides via four-wave mixing. Due to the Sagnac effect, the effective path length of the two photons varies. Subsequently, the photons interfere on a beam splitter having two outputs and two inputs, and Hong-Ou-Mandel interference occurs. During this interference, two indistinguishable photons always leave the same output of a beam splitter. The number of photons impinging is in each case measured with detectors at each output of the beam splitter. If no rotation rate is applied to the system, both photons are only measured at one detector. However, if a rotation rate is applied, there is a probability that only one detector will measure the photons or that each detector will in each case measure one photon. This probability depends on the rotation rate applied.

The method with quantum enhancement was shown experimentally with large optics and discussed theoretically for chip-integrated solutions, cf. Fink et al., ibid.; De Leonardis, F.; Soref, R.; De Carlo, M.; Passaro, V. M. N. "On-Chip Group-IV Heisenberg-Limited Sagnac Interferometric Gyroscope at Room Temperature," Sensors 20, 3476 (2020) https://doi.org/10.3390/s20123476. However, they have the disadvantage that a single-photon source and single-photon detectors are needed. These single-photon components are either sized very large (Fink et al.) or can currently be reliably used chip-integrated only at a particular temperature (De Leonardis et al.).

SUMMARY

According to the present invention, an optical gyroscope assembly for measuring a rotation rate is provided. Advantageous example embodiments of the present invention are disclosed herein.

Current optical gyroscopes are either very large in order to realize good sensitivity or are not sensitive enough in chip-integrated applications. The present invention realizes an optical chip-integrated gyroscope which can measure a rotation rate and has high sensitivity. An advantage is that this is possible in a compact sensor system, which can be realized in a chip-integrated manner. For this purpose, the Hong-Ou-Mandel effect is exploited without using a costly single-photon source. In order to generate the quantum states, costly and large crystals are used in previous gyroscope applications, or four-wave mixing in long paths is exploited. Instead, in this invention, a ring resonator is pumped with light, which produces squeezed quantum states. This has the advantage that it can be realized compactly and operated over a wide temperature range.

Quantum states can be produced in compact, chip-integrated solutions based on ring resonators. In this case, pumped light is transmitted into a ring resonator. Therein, a sharp increase in intensity is produced, as a result of which spontaneous or also stimulated four-wave mixing takes place. This produces two squeezed multiphoton quantum states, cf. Lu, X., Li, Q., Westly, D. A. et al., "Chip-integrated visible-telecom entangled photon pair source for quantum communication;" Nat. Phys. 15, 373-381 (2019). https://doi.org/10.1038/s41567-018-0394-3.

In the context of the present invention, a ring resonator is now, in particular, realized directly on an optical chip, which ring resonator is pumped with laser light and is used as a gyroscope for the integrated sensor system application. This produces directly squeezed multiphoton quantum states on the chip and in the ring resonator. This is possible due to the Kerr effect in the ring resonator, as a result of which four-wave mixing occurs. In addition, chip-integrated optics, such as multimode interferometers, waveguides and lattice couplers, are used. The laser source may be chip-integrated or the laser beam may be generated outside the chip and may be coupled thereinto via a lattice coupler or laterally. In both cases, the light can be directed from the coupling site to the light guide via tapers in order to minimize losses.

Specifically, according to an example embodiment of the present invention, an optical gyroscope assembly for measuring a rotation rate is provided, comprising a first light guide and a first multimode interferometer with an input, which is connected to the first light guide, and two outputs, which are each connected to a second light guide. The first multimode interferometer in particular serves to divide laser light into two parts, which in particular have the same intensity.

According to an example embodiment of the present invention, the gyroscope assembly furthermore comprises a ring resonator on each of the second light guides and a second multimode interferometer with two inputs, each connected to one of the second light guides, and two outputs, each connected to a third light guide. The second multimode interferometer is in particular used to merge and entangle the quantum states from the ring resonators by means of the Hong-Ou-Mandel effect. The third light guides serve as interference paths in which a rotation-rate-dependent phase shift occurs as a result of the Sagnac effect.

According to an example embodiment of the present invention, the gyroscope assembly furthermore comprises a third multimode interferometer with two inputs, each connected to one of the third light guides, and two outputs, each connected to a fourth light guide. The third multimode interferometer in particular serves to merge the two interference paths and to dissolve the entanglement as a function of the phase shift.

According to the present invention, the gyroscope assembly in one example embodiment furthermore comprises a respective optical decoupling element for decoupling light from each of the fourth light guides, so that the exiting photons can be detected and counted.

In one example embodiment of the present invention, the gyroscope assembly comprises two photodetectors, each of which is arranged downstream of one of the decoupling elements and is irradiated with light from the decoupling element or is directly connected to the fourth light guide.

In one example embodiment of the present invention, each decoupling element is designed as a lattice coupler. Focusing lattice couplers or also lattice couplers with mirror elements among them can be used to achieve higher efficiency. In addition, the light may be directed via adiabatic taper structures from the light guide to the lattice coupler in order to minimize losses. This is technically simple and reliable to produce, in particular in microsystem technology.

In one example embodiment of the present invention, the optical gyroscope assembly comprises a counting circuit for counting photons detected by the two photodetectors, or a measuring circuit for measuring the intensity of light impinging on the detectors.

In one example embodiment of the present invention, the optical gyroscope assembly comprises a laser light source arranged upstream of the first multimode interferometer or of the first light guide in order to radiate light into the first multimode interferometer or the first light guide. The laser source may be chip-integrated or the laser beam may be generated outside the chip and may be coupled thereinto via an optical coupling element, such as a lattice coupler, or laterally.

In one example embodiment of the present invention, at least one of the two third light guides extends spirally. The optical path length can thus be extended without the space requirement increasing significantly.

In one example embodiment of the present invention, the two third light guides extend parallel at least in part, preferably over at least 50% of their length. This can achieve that interferences act as equally as possible on both third light guides.

In one example embodiment of the present invention, the two third light guides are arranged overlapping, which reduces the space requirement and susceptibility to interference, or not overlapping, which reduces the losses.

In one example embodiment of the present invention, the two third light guides are longer than the two second light guides and/or the first light guide. The installation space can thus be optimally exploited. While the first and second light guides are approximately 0.1 mm to 5 mm in length, the third light guides may be approximately 50 mm to 2 cm in length.

In one example embodiment of the present invention, at least one phase shifter is arranged upstream and/or downstream of the third light guides. Thus, the sensitivity of the measurement can be influenced, and a closed loop system can be realized. The phase shift of the two light paths can thus be actively controlled and regulated in the most sensitive range.

In one example embodiment of the present invention, the same ring resonator is arranged on each of the second light guides. Thus, only one ring resonator is necessary in order to generate the quantum states. In another embodiment, a different ring resonator is in each case arranged on each of the second light guides. In this case, two different ring resonators are thus present in order to generate the quantum states.

In one example embodiment of the present invention, the optical gyroscope is designed as a system-on-a-chip. This requires little installation space and is suitable for series production.

Additional advantages and example embodiments of the present invention result from the description herein and the figures.

The present invention is illustrated schematically in the figures on the basis of exemplary embodiments and is described below with reference to the figures.

DETAILED DESCRIPTION OF EXAMPLE EMBODIMENTS

Figure 1:
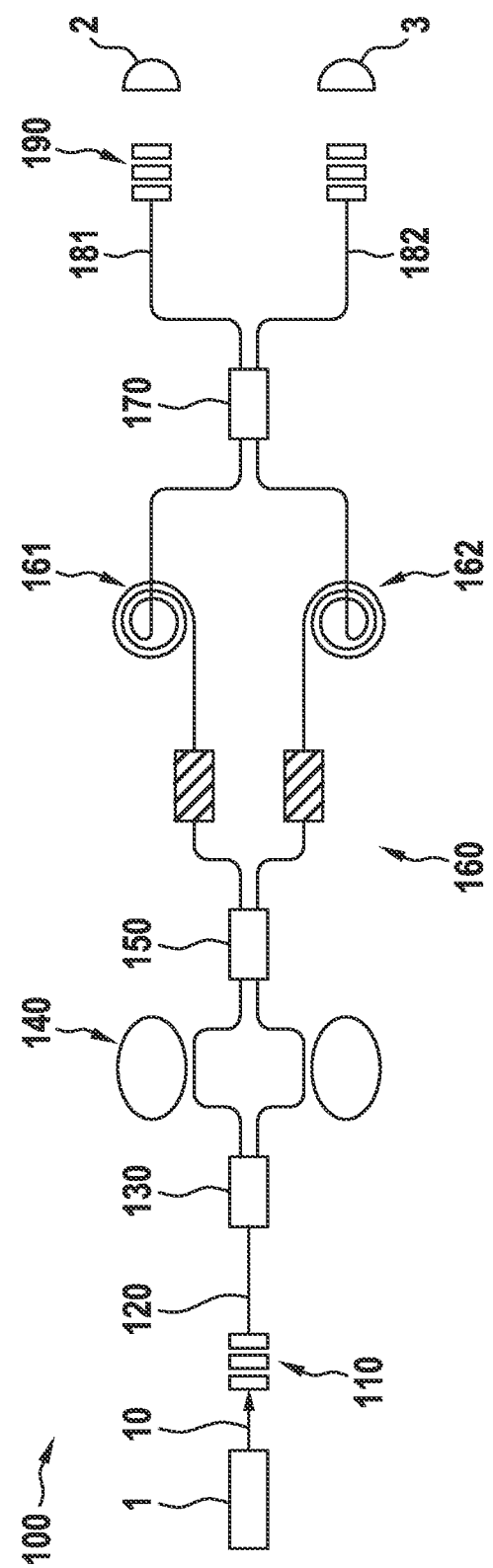
FIG. 1 shows a first example embodiment of an optical gyroscope assembly for measuring a rotation rate in a schematic plan view, according to the present invention.
Figure 2:
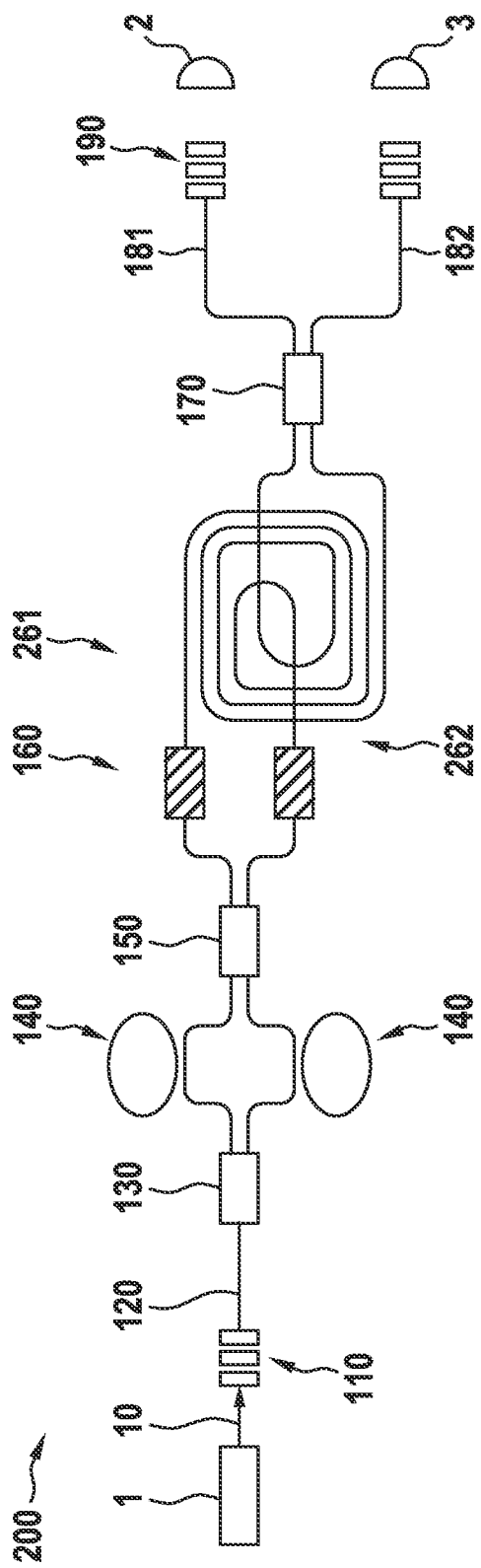
FIG. 2 shows a second example embodiment of an optical gyroscope assembly for measuring a rotation rate in a schematic plan view, according to the present invention
Figure 3:
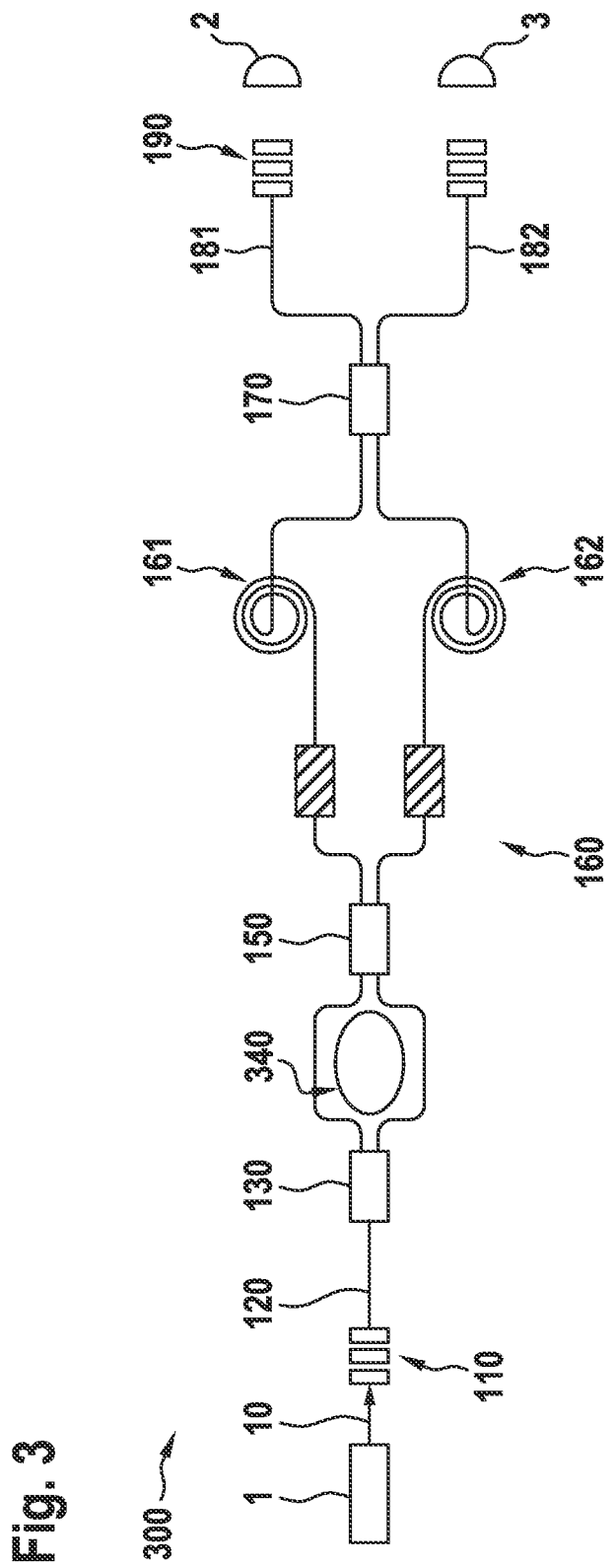
FIG. 3 shows a third example embodiment of an optical gyroscope assembly for measuring a rotation rate in a schematic plan view, according to the present invention.

In FIG. 1, a first embodiment of an optical gyroscope assembly for measuring a rotation rate in a schematic plan view is shown and denoted overall by 100. In FIGS. 2 and 3, a second and a third embodiment are respectively shown and denoted by 200 and 300, wherein FIGS. 1, 2 and 3 are described in a coherent and comprehensive manner below and only the differences are discussed separately. Unless otherwise mentioned, the following description thus applies equally to all embodiments.

The optical gyroscope assembly comprises a laser light source 1 that radiates laser light 10, in particular at a particular wavelength or frequency. This laser source may be manufactured in a chip-integrated manner or a source outside the assembly is used, the light of which is coupled into a light guide.

In the present case, the gyroscope assembly comprises an optical coupling element 110, which is used to couple laser light 10 into a light guide 120. The coupling element 110 may be a lattice coupler, i.e., an element having periodic structures at which the light is refracted and directed in a particular direction, or may be based on lateral chip coupling.

All light guides mentioned here and below may in particular be designed as fiber-optic light guides or as optical waveguides. In this case, the optical waveguides may be realized as ridge waveguides, or as rib waveguides, in order to minimize losses.

The light guide 120 is connected at its end to an input of a first multimode interferometer 130 comprising the input and two outputs. The multimode interferometer 130 is configured to decouple the laser light, coupled in on the input side, on the output side into two light paths, in particular in equal parts. A multimode interferometer is capable of dividing light in particular parts into particular directions. In the present case, it is in particular designed as a chip-integrated beam splitter. Each of the two outputs is connected to a second light guide at which is arranged or to which is coupled a ring resonator 140, 340. Two ring resonators 140 are present in FIGS. 1 and 2, i.e., a separate ring resonator 140 is present on each second light guide, whereas only one common ring resonator 340 for both second light guides is present in FIG. 3. The common ring resonator 340 is located between and surrounded, or framed, by the two second light guides.

In a ring resonator, squeezed photons that act as quantum particles are produced by means of spontaneous or stimulated four-wave mixing. These quantum states are again decoupled from the ring resonator and subsequently used for quantum operations, as explained.

Downstream of the one or the two ring resonators 140, 340, a second multimode interferometer 150 is arranged, which comprises two inputs and two outputs and merges the two second light guides and subsequently divides them into two third light guides as interference paths. In so doing, the quantum states are merged in the second multimode interferometer 150 and entangled thereon due to Hong-Ou-Mandel interference. This causes them to both leave the same output of the multimode interferometer.

The interference paths are denoted by 161 and 162 in FIGS. 1 and 3, and by 261 and 262 in FIG. 2. The interference paths form a sensor region of waveguides in which the Sagnac effect occurs. When the optical gyroscope 100, 200, 300 is rotated, one light path effectively becomes longer and the other effectively becomes shorter. As a result, a phase shift of the entangled quantum state occurs.

FIGS. 1, 3 on the one hand and FIG. 2 on the other hand show different realizations of the sensor region, which differ by the embodiment of the interference paths 161, 162 on the one hand and 261, 262 on the other hand. It can be seen that all interference paths extend spirally so that a sufficiently long light path can be provided. In contrast to the embodiment 100 or 300, in which the interference paths 161, 162 are arranged completely separately from one another, the interference paths 261, 262 in FIG. 2 are designed to overlap. In particular, the interference paths 261, 262 extend next to one another over long distances so that external interferences act substantially equally on both paths. The embodiment 100, 300 according to FIGS. 1 and 3 is lower-loss, and the embodiment 200 according to FIG. 2 is more stable against external influences.

Arranged downstream of the interference paths is a third multimode interferometer 170, which likewise comprises two inputs and two outputs and serves to merge the two interference paths and divide them into two fourth light guides 181, 182.

Here, depending on the phase shift, the entangled state dissolves with a certain probability. If it dissolves, the photons in each case follow a different output of the multimode interferometer 170, while they select the same output if the entangled state remains. Which output this is exactly is random.

The fourth light guides 181, 182 end at a respective optical decoupling element 190, which is configured to decouple light from each of the light guides and can be designed as a lattice coupler, for example.

The light decoupled from the decoupling elements 190 subsequently impinges on photodetectors 2, 3 arranged downstream of each of the decoupling elements and radiated with light from the decoupling elements.

The photodetectors 2, 3 now only need to measure whether photons impinge or not. The results of both photodetectors 2, 3 may be combined to form a so-called coincidence rate. As a result, a kind of digital measurement takes place. The coincidence rate indicates whether both detectors measure a photon or a quantum state or only one detector measures something. The phase shift and thus the rotation rate can be calculated therefrom. The probability of dissolving the entanglement follows a sinusoidal function as a function of the rotation rate.

On the input side or output side of one or both interference paths, a phase shifter 160 may in each case be arranged in order to keep the assembly in the most sensitive range, which corresponds to the steepest increase in the sinusoidal function.

A phase shifter can actively change the phase of the light.

The elements shown, in particular the entire optical gyroscope assembly 100 with or without laser light source 1 and photodetectors 2, 3 is designed as a microsystem on a semiconductor chip as the substrate, in particular as a so-called system-on-a-chip (SoC).

What is claimed is:

1. An optical gyroscope assembly configured to measure a rotation rate, comprising:
   a first multimode interferometer with an input for receiving light and two outputs, each of the two outputs of the first multimode interferometer being connected to a respective second light guide;
   a ring resonator on each of the second light guides;
   a second multimode interferometer with two inputs and two outputs, each of the two inputs of the second multimode interferometer connected to one of the second light guides, each of the two outputs of the second multimode interferometer connected to a respective third light guide; and
   a third multimode interferometer with two inputs and two outputs, each of the two inputs being connected to one of the third light guides, and each of the two outputs being connected to a respective fourth light guide.

2. The optical gyroscope assembly according to claim 1, further comprising:
   an optical coupling element configured to couple laser light into the input of the first multimode interferometer or into a first light guide connected to the input of the first multimode interferometer.

3. The optical gyroscope assembly according to claim 1, further comprising:
   a respective optical decoupling element configured to decouple light from each of the fourth light guides.

4. The optical gyroscope assembly according to claim 2, wherein the coupling element is a lattice coupler.

5. The optical gyroscope assembly according to claim 3, wherein each of the decoupling elements is a lattice coupler.

6. The optical gyroscope assembly according to claim 1, further comprising:
a laser light source arranged upstream of the first multimode interferometer.

7. The optical gyroscope assembly according to claim 1, further comprising:
two photodetectors, each arranged downstream of one of the fourth light guides.

8. The optical gyroscope assembly according to claim 7, further comprising:
a counting circuit configured to count photons detected by the two photodetectors.

9. The optical gyroscope assembly according to claim 1, wherein at least one of the third light guides extends spirally.

10. The optical gyroscope assembly according to claim 1, wherein the third light guides extend parallel to each other over at least 50% of their length.

11. The optical gyroscope assembly according to claim 1, wherein the third light guides overlap with each other or do not overlap with each other.

12. The optical gyroscope assembly according to claim 1, wherein the third light guides are longer than the second light guides and/or a first light guide connected to the input of the first multimode interferometer.

13. The optical gyroscope assembly according to claim 1, further comprising:
at least one phase shifter upstream and/or downstream of the third light guides.

14. The optical gyroscope assembly according to claim 1, wherein the same ring resonator is arranged at each of the second light guides, or wherein a different ring resonator is in each case arranged on each of the second light guides.

15. The optical gyroscope assembly according to claim 1, wherein the optical gyroscope assembly is a system-on-a-chip.

* * * * *